United States Patent [19]

Sugiyama

[11] Patent Number: 5,798,796
[45] Date of Patent: Aug. 25, 1998

[54] CODING PRIORITY AND NON-PRIORITY IMAGE DATA TO BE LESS THAN A PREDETERMINED QUANTITY

[75] Inventor: Kenji Sugiyama, Yokosuka, Japan

[73] Assignee: Victor Company of Japan, Ltd., Yokohama, Japan

[21] Appl. No.: 747,772

[22] Filed: Nov. 13, 1996

Related U.S. Application Data

[63] Continuation of Ser. No. 249,735, May 26, 1994, abandoned.

[30] Foreign Application Priority Data

May 26, 1993 [JP] Japan ................................. 5-145425

[51] Int. Cl.$^6$ ........................................................ H04N 7/24
[52] U.S. Cl. ................................................. 348/405; 348/438
[58] Field of Search ................................. 348/405, 419, 348/389, 388, 390, 384, 437, 438; 358/335, 342, 310; 360/32, 9.1, 48; 386/68, 81, 109, 111, 112; H04N 7/13, 7/133

[56] References Cited

U.S. PATENT DOCUMENTS

| 5,016,010 | 5/1991 | Sugiyama | 341/67 |
| 5,055,927 | 10/1991 | Keesen et al. | 348/389 |
| 5,073,820 | 12/1991 | Nakagawa et al. | 348/405 |
| 5,144,424 | 9/1992 | Tristan | 348/405 |
| 5,196,933 | 3/1993 | Henot | 348/419 |
| 5,267,037 | 11/1993 | Sugiyama | 358/136 |
| 5,351,131 | 9/1994 | Nishino et al. | 358/335 |
| 5,418,620 | 5/1995 | Nishino et al. | 358/335 |

FOREIGN PATENT DOCUMENTS

| A-0 469 842 | 2/1992 | European Pat. Off. . |
| A-0 542 196 | 7/1992 | European Pat. Off. . |
| 3-263927 | 11/1991 | Japan . |
| 4-105425 | 4/1992 | Japan . |
| 4-227185 | 8/1992 | Japan . |
| 6-141298 | 5/1994 | Japan . |
| A-2 259 217 | 3/1993 | United Kingdom . |
| WO-A-92 07445 | 4/1992 | WIPO . |

OTHER PUBLICATIONS

1993 Picture Coding Symposium Proceedings, Mar. '93, Lausanne, CH pp. 18.20 A–B, XP000346416 LIU et al. 'Fixed Bit Rate Television Compression System with Specific Application to Digital Video Recording'.

Signal Processing VI Theories and Applications Eusipco–92, vol. I, Aug. '92, Bruxelles, BE pp. 227–230, XP000348648 Ansari et al. 'A Hierarchical Scheme for Coding Video at 4–10 Mbps'.

IEEE Transactions on Circuits and Systems for Video Technology, vol. 3, No. 3, Jun. '93, New York US pp. 230–237, XP000385796 Kinoshita et al. 'Variable–Bit–Rate HDTV CODEC with ATM–Cell–Loss Compensation'.

Singal Processing, Image Communication, vol. 4, No. 4/5, Aug. '92, Amsterdam NL pp. 401–420, XP000293757 DE with et al. 'Digital consumer HDTV recording based on motion–comensated DCT coding of video signals'.

Primary Examiner—Bryan Tung
Attorney, Agent, or Firm—Jacobson, Price, Holman & Stern, PLLC

[57] ABSTRACT

An image encoding apparatus has an encoder for encoding low-resolution image information as priority image information in hierarchical encoding, another encoder for encoding non-priority image information other than the priority image information, a first code quantity controller for controlling a sum total of the generated code quantities of both the priority image information and the non-priority image information within a predetermined value and a code quantity limiter for limiting the generated code quantity of the priority image information within a predetermined ratio to the sum total code quantity.

6 Claims, 5 Drawing Sheets

WHEN CODE QTY OF PR'TY VIDEO DATA IS MAX

WHEN CODE QTY OF PR'TY VIDEO DATA IS LESS THAN MAX

CODING PRIORITY AND NON-PRIORITY IMAGE DATA TO BE LESS THAN A PREDETERMINED QUANTITY

BACKGROUND OF THE INVENTION

This is a Continuation of application Ser. No. 08/249,735, filed May 26, 1994 which was abandoned upon the filing hereof.

FIELD OF THE INVENTION

The present invention relates to an image encoding apparatus for encoding signals efficiently in a small code quantity, which is suitable for use in a recording, transmitting or display unit required to process digital signals, and more specifically to an image encoding apparatus for encoding priority image information (reproduced by priority) in distinction from other image information and a recording medium used therewith. Here, the priority image information is an image searched from a recording medium at high speed or a low-resolution image obtained when image information has been encoded hierarchically.

DESCRIPTION OF THE PRIOR ART

When image information is encoded at a high efficiency, there exists some image information (referred to as priority image information, hereinafter) which is effective when reproduced by priority. In this case, only the priority image information is to be decoded and reproduced according to the objects. Further, the image information (referred to as non-priority image information, hereinafter) other than the priority image information is insignificant even if decoded and reproduced alone.

For instance, in the case of the hierarchical encoding of the existing television signals (e.g., NTSC (National Television System Committee Color Television)) and HDTV (high-definition image television) signals, the difference information between the existing TV signals and the HDTV signals is encoded in addition to the existing TV signals, and both the encoded information signals are decoded and further added to reproduce the HDTV information signals. Here, when only the existing TV information signals are decoded, the existing TV signals can be of course reproduced.

In the above-mentioned case, the image information of the existing TV signals is the priority image information, and the difference information between both is the non-priority image information.

Further, when signals are reproduced from a recording medium, a high speed search is often required by displaying the image information on a display unit. In this case, when the image information is encoded by predicting video signals between pictures, the video signals are encoded independently for each frame at intervals of several frames.

Further, when the high-speed search is effected during reproduction, only the image information encoded independently is reproduced. In this case, the frame information encoded independently is the priority image information, and the frame information predicted between pictures is the non-priority image information.

As an example of the hierarchical encoding, the case where two signals such as existing TV signals and HDTV signals are encoded at two different resolutions will be described hereinbelow with reference to FIG. 1.

FIG. 1 is a block diagram showing an example of prior art image encoding apparatus. In FIG. 1, a video signal inputted through an input terminal 1 is a video signal of a high resolution. The inputted video signal is given to a low-pass filter (referred to as LPF, hereinafter) 2 and a subtraction input of a subtracter 3. The frequency band of this inputted video signal is limited to about ½ in both the vertical and horizontal directions. The limited video signal is given to a sub-sampler 11. The sub-sampler 11 extracts ½ of the pixels arranged in both the vertical and horizontal directions to obtain a low-resolution image. The video signal of a low-resolution is given to an encoder 12 and an interpolator 4.

The encoder 12 executes a discrete cosine transformation (referred to as DCT), quantizes the coefficients obtained by this DCT processing on the basis of a quantization step size given by a code quantity controller 14, and further encodes the quantized coefficients to obtain variable-length encoded compressed video data. The encoded compressed video data are given to a buffer 13. Since the code quantity of the variable-length encoded compressed video data fluctuates, the code quantity is uniformalized by the buffer 13, and then the video data of uniformalized code quantity are given to a multiplexer 8.

On the other hand, buffer sufficiency information is given from the buffer 13 to the code quantity controller 14. Therefore, the code quantity controller 14 outputs a quantization step size information to the encoder 12 on the basis of the buffer sufficiency information so that the code quantity generated by the encoder 12 can be uniformalized constant.

In more detail, when data are stored in the buffer 13 excessively and thereby the generated data quantity is determined large, the quantization step size is increased. In contrast with this, when the generated data quantity is determined small (almost vacant), the quantization step size is reduced.

On the other hand, the interpolator 4 interpolates the pixels not extracted in order to generate the interpolated video signal whose pixel number is the same as that of the input video signal. The interpolated video signal is given to the subtracter 3. The subtracter 3 subtracts the interpolated signal from the input video signal to obtain the high-frequency component signal. The obtained high-frequency component signal is applied to another encoder 5.

The operations of another encoder 5, another buffer 6 and another code quantity controller 7 are basically the same as those of the encoder 12, the buffer 13 and the code quantity controller 14. However, only the number of samples is different from each other.

The video data encoded by the encoder 5 are given to the multiplexer 8 via the buffer 6. The video data multiplexed by the multiplexer 8 are outputted through an data output terminal 9.

When the video data obtained by the image encoding apparatus as described above have been transmitted, it is possible to extract only the low-resolution image information from the image information and to reproduce the extracted low-resolution video data.

In the above-mentioned prior art image encoding apparatus (including prior art recording medium and prior art reproducing apparatus), however, since these apparatuses cannot cope with the reproduction of only the priority image information, whenever only the priority image information is required to be reproduced, it has been so far necessary to read the unnecessary image information simultaneously. Here, the priority image information is the low-resolution image when the image information is encoded hierarchically or the image obtained by encoding independently (referred to as independent encoded image) by use of inter-picture prediction (referred to as inter-picture prediction encoding).

In particular, when the code quantity of the priority image information is not yet determined as when the image stands still, there exists a possibility that the code quantity of the priority image information becomes the same as that of the whole image information. In this case, even if only the priority image information is required to be read, since all the image information is inevitably read out, it is impossible to read only the priority image information at high speed.

On the other hand, when the code quantity of the priority image information is fixedly determined, since the code quantity is not necessarily appropriate to the image information from the picture quality standpoint, there exists a problem in that the picture quality is inevitably deteriorated.

SUMMARY OF THE INVENTION

With these problems in mind, therefore, it is the object of the present invention to provide an image encoding apparatus and a recording medium, by which image information of specific sorts can be read easily at high speed.

To achieve the above-mentioned object, the present invention provides an apparatus for encoding image information comprising: first encoding means for encoding a priority image information, an image being reproducible only with the priority image information; second encoding means for encoding a non-priority image information except the priority image information; first control means for controlling quantity of generated codes so that a sum of quantities of the priority image information and the non-priority image information is smaller than a predetermined quantity; and second control means for controlling the quantity of generated codes so that the quantity of the priority image information is smaller than a predetermined ratio with respect to the sum of quantities.

Here, the first encoding means encodes priority image information which is independent encoded image information encoded by inter-image prediction encoding or low-resolution image information encoded by hierarchical encoding.

Further, the present invention provides a recording medium on which encoded image information is recorded, wherein priority image information reproducible by itself is recorded on specific tracks arranged periodically.

Here, the priority image information is any of independent encoded image information by inter-image prediction encoding, low-resolution image information by hierarchical encoding, and image information of wider quantization step size.

Further, the present invention provides an apparatus for encoding image information to be recorded on a recording medium, comprising: separating means for separating first image information, an image being reproducible only with the first image information, and second image information, the image being not reproducible only with the second image information, from the recorded image information; first encoding means for encoding the first image information; second encoding means for encoding the second image information; outputting means for multiplexing codes outputted by said first and second encoding means and outputting the multiplexed codes; first control means for controlling quantity of the multiplexed codes within such a first predetermined code quantity that quantities of the first and second codes outputted by the first and second encoding means, respectively can be well balanced with each other; and second control means for controlling the first and second code quantities in such a way that the first code quantity is determined within a predetermined ratio to the multiplexed code quantity according to a recording format of the recording medium.

Here, the first control means comprises: quantization step size control means for controlling a quantization step size of each of said first and second encoding means; and setting means responsive to the first and second code quantities and the respective quantization step sizes, for setting first and second target code quantities of said first and second encoding means, respectively to obtain the first predetermined code quantity; and said second control means comprises means responsive to the first and second target code quantities, for controlling said quantization step size controlling means.

Further, when the second target code quantity is less than a second predetermined code quantity determined according to the recording format of the recording medium, said means for controlling said quantization step size controlling means controls said quantization step size controlling means on the basis of the first and second target code quantities; and when the second target code quantity is more than the second predetermined code quantity, said means for controlling said quantization step size controlling means controls said quantization step size controlling means on the basis of the second target code quantity and a third target code quantity obtained by subtracting the second target code quantity from the multiplexed code quantity.

Further, the present invention provides an apparatus for encoding image information to be recorded on a recording medium, comprising: encoding means for encoding in time division mode first image information, an image being reproducible only with the first image information, and second image information, the image being not reproducible only with the second image information, both contained in the image information; first controlling means for controlling a sum total of the first and second code quantities corresponding to the first and second image information outputted by said encoding means, respectively to such a first predetermined code quantity that the first and second code quantities can be balanced with each other; and second control means for controlling the first and second code quantities in such a way that the first code quantity is determined within a predetermined ratio to the sum total code quantity according to a recording format of the recording medium.

Here, the first control means comprises: quantization step size control means for controlling a quantization step size of said encoding means; and setting means responsive to the first and second code quantities and the quantization step size, for setting a first target code quantity of said encoding means to obtain the first predetermined code quantity; and said second control means comprises means responsive to the first target code quantity, for controlling said quantization step size controlling means.

Further, when the first target code quantity is less than a second predetermined code quantity determined according to the recording format of the recording medium, said means for controlling said quantization step size controlling means controls said quantization step size controlling means on the basis of the first target code quantity; and when the first target code quantity is more than the second predetermined code quantity, said means for controlling said quantization step size controlling means controls said quantization step size controlling means on the basis of the second target code quantity obtained by subtracting the first target code quantity from the sum total code quantity.

Further, the present invention provides an apparatus for encoding image information comprising: first encoding means for encoding a priority image information, an image being reproducible only with the priority image information; second encoding means for encoding a non-priority image information except the priority image information; first control means for controlling quantity of generated codes so that a sum of quantities of the priority image information and the non-priority image information is smaller than a predetermined quantity; and second control means for controlling the quantity of generated codes so that the quantity of the priority image information is smaller than a predetermined ratio with respect to the sum of quantities; and output means for multiplexing codes outputted by said first and second encoding means and outputting the multiplexed codes.

DETAILED DESCRIPTION OF THE PREFERRED EMBODIMENTS

Figure 1:
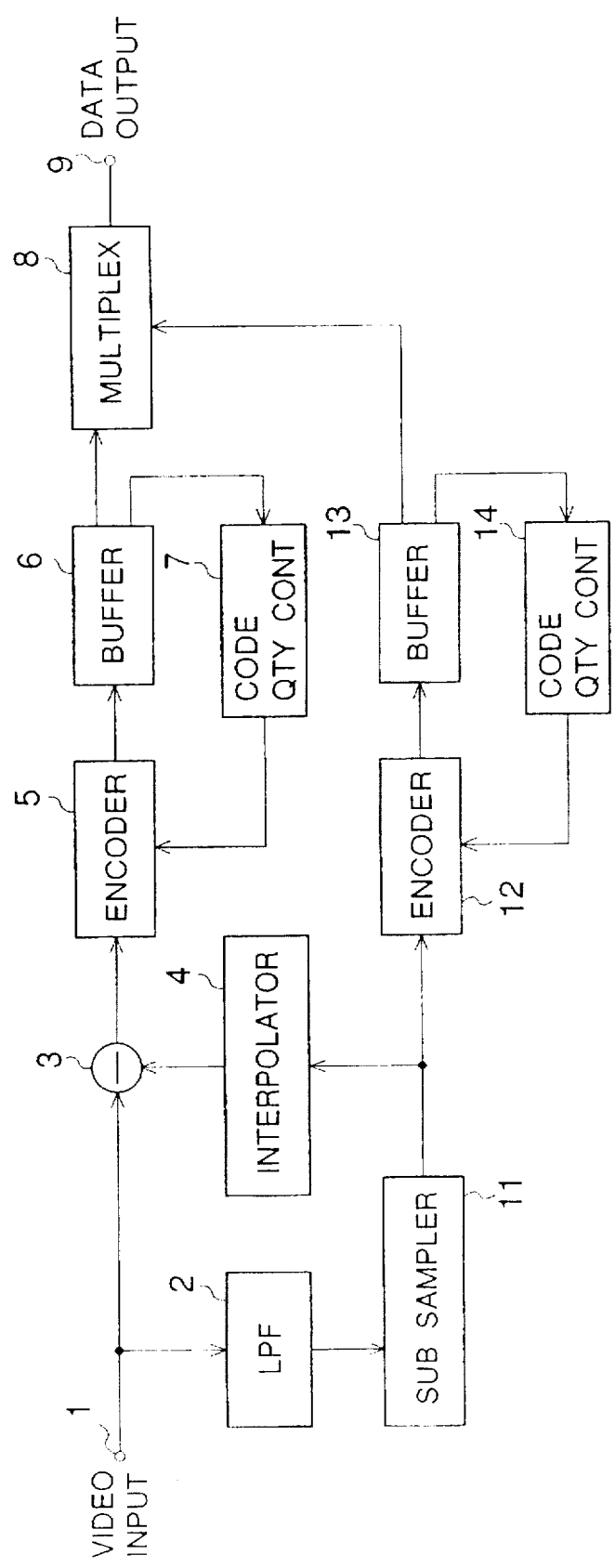
FIG. 1 is a block diagram showing an example of prior art image encoding apparatuses.
Figure 2:
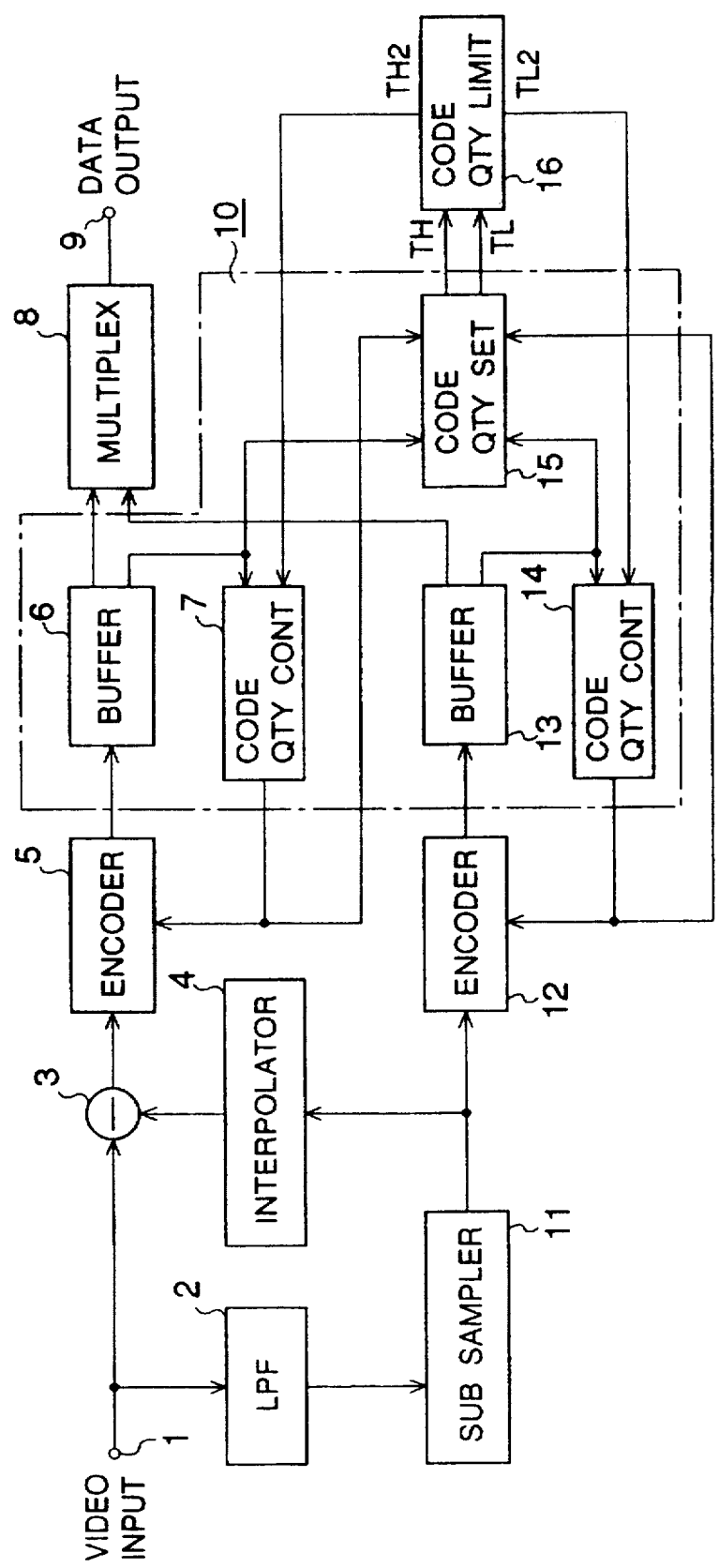
FIG. 2 is a block diagram showing a first embodiment of the image encoding apparatus according to the present invention.

A first embodiment of the image encoding apparatus according to the present invention will be described hereinbelow with reference to FIG. 2. In FIG. 2, the same reference numerals have been retained for similar elements which have the same functions as with the case of the prior art apparatus previously described with reference to FIG. 1, and any detailed description is omitted herein. The major point different between the two image encoding apparatuses shown in FIGS. 1 and 2 is that: in this embodiment a code quantity setter 15 and a code quantity limiter 16 are additionally incorporated in the image encoding apparatus shown in FIG. 2.

In the image encoding apparatus shown in FIG. 2, a low-resolution video signal (e.g., the existing TV signal such as NTSC) can be obtained from an inputted high-definition video signal (e.g., HDTV signal), and the obtained image is encoded hierarchically. In reproduction, it is possible to reproduce only the low-resolution image.

Further, the image encoding apparatus shown in FIG. 2 is provided with an encoder 12 for encoding the priority image information (first image information) (which can be reproduced as an image by itself); another encoder 5 for encoding the non-priority image information other than the priority image information (second image information) (which cannot be reproduced as an image by itself); first code quantity control means 10 for controlling a generated sum total code quantity of both the priority and non-priority image information within a predetermined value; and a code quantity limiter 16 for controlling the code quantity of the priority image information within a predetermined ratio to the sum total code quantity of both the priority and non-priority image information.

The first code quantity control means 10 is composed of two buffers 13 and 6, two code quantity controllers 14 and 7, and a code quantity setter 15. Further the second code quantity control means is the code quantity limiter 16.

In FIG. 2, a video signal inputted through an input terminal 1 is of high resolution image. The inputted video signal (high-resolution image information) is given to an LPF (low-pass filter) 2 and a subtracter 3. The input video signal is limited down to about ½ in frequency band in both vertical and horizontal directions by the LPF 2 and then applied to a sub-sampler 11. The sub-sampler 11 extracts a half of the pixels in both vertical and horizontal directions to obtain low-resolution video data. The obtained low-resolution video data are given to an encoder 12 and an interpolator 4.

The encoder 12 transforms the low-resolution video signal in accordance with DCT (discrete cosine transformation) processing, quantizes the transformed coefficients on the basis of a quantization step size applied by the code quantity controller 14 to obtain variable-length encoded compressed video data. The obtained variable-length encoded compressed video data are given to the buffer 13. The buffer 13 uniformalizes the fluctuations of the generated code quantity, and outputs the video data of uniformalized code quantity to a multiplexer 8. Further, the generated code quantity for each pixel block is given from the buffer 13 to the code quantity setter 15 and the code quantity controller 14, respectively.

The code quantity controller 14 applies the quantization step size to the encoder 12 and the code quantity setter 15, respectively in such a way that the code quantity generated by the encoder 12 matches a target code quantity given by the code quantity limiter 16.

On the other hand, the interpolator 4 interpolates the pixels not extracted by the sub-sampler 11 to obtain the video signal whose pixel number is the same as that of the input video signal. The interpolated video signal is given to a subtraction input terminal of the subtracter 3 as the interpolated video signal. The subtracter 3 subtracts the interpolated video signal from the input video signal to obtain an video signal of higher frequency components. The obtained video signal is given to the encoder 5.

The operations of the encoder 5 and the buffer 6 are basically the same as those of the encoder 12 and the buffer 13 both for processing the sub-sampled signal. However, the number of samples to be processed is different from each other. The video data uniformalized by the buffer 6 are applied to the multiplexer 8.

The multiplexer 8 multiplexes the video data of low-resolution and the video data of high frequency components in accordance with a recording format. The multiplexed video data are outputted through a data output terminal 9. Here, the low-resolution video data are those of relatively low sampling frequency because the image resolution is determined by the sampling frequency. Further, the high frequency component video data are those of relatively high frequency components in the existing frequency range between DC and a half of the sampling frequency.

The feature of the present invention resides in the operation of the code quantity setter 15 and the code quantity limiter 16 as described below.

In the range where the code quantity of the priority image information is less than a limit value, the picture quality of the reproduced image has a priority. That is, the code quantity setter 15 determines two target code quantities TL (for the low-resolution video data) and TH (for the high frequency video data), respectively so that the video data can be encoded on the basis of a predetermined quantization balance. However, when the code quantity of the priority image information increases and thereby must be limited, the code quantity limiter 16 controls the target code quantity at the sacrifice of the quantization balance. Here, the balance of the quantization implies such a fact that the quantization step size for the high frequency component video data is determined to be about 1.5 times wider than that of the low-resolution video data. This is because the image quality of the high frequency component image is excellent visually even if the quantization step size is determined to be wider than that of the low-resolution image.

The code quantity setter 15 receives the respective quantization step sizes of the low-resolution video data and the high frequency component video data from the code quantity controller 14, and in addition the respective generated code quantities from the buffers 13 and 6. In general, since the quantization step size is reversely proportional to the generated code quantity, the target code quantities TL and TH are determined for each frame so that the quantization step sizes of both the low-resolution video data and the high frequency component video data can be well balanced with each other. The determined target code quantities TL and TH are both given to the code quantity limiter 16. The code quantity limiter 16 limits the given target code quantities TL and TH, respectively and outputs them again as TL2 and TH2.

Here, if TL is smaller than a specified value (e.g., ½ of the total code quantity), TL2 and TH2 are both kept as TL and TH. If TL is larger than the specified value, however, TL2 is determined to the specified value, and TH2 is determined to a value obtained by subtracting the specified value from the total code quantity. This specified value is dependent upon the recording forms of the recording medium. For instance, when the specific tracks on which the priority image information is recorded is in the ratio of 1 to 2, the specific value is determined to be ½ of the total code quantity. When the specific tracks is in the ratio of 1 to 3, the specific value is determined to be ⅓ of the total code quantity.

In this case, although the encoder 12 encodes the low-resolution image information and the encoder 5 encodes the high frequency component signal both in the ordinary well-balanced quantization step size, whenever the code quantity of the low-frequency image information is limited, the quantization balance is no longer maintained.

As described above, in the encoding apparatus according to the present invention, under the normal conditions, although the code quantity ratio changes, the quantization balance is well maintained between both the low-resolution video data and the high frequency component video data for providing a better image quality. However, since an upper limit is set, the code quantity of the lower-resolution image is restricted below the upper limit. Therefore, it is possible to obtain both a high quality image and a high speed reading of the priority image information simultaneously.

On the other hand, when the generated code quantity is required to match with the target code quantity under feedback control by use of the code quantity controllers 14 and 7 for instance, there exists a possibility that the image quality deteriorates when image complexity (i.e., activity) changes largely within the picture.

To overcome this problem, it is also possible to adopt such a control method that the necessary code quantity for each processing block is previously estimated on the basis of the image activity under the feed-forward control; and then feedback control is executed after the target code quantities (TH and TL) have been distributed on the basis of the estimated code quantities.

The above-mentioned method of combining the feed-forward control and the feedback control has been already disclosed in U.S. Pat. No. 5,016,010, for instance by the same inventors and the same applicant.

Figure 3:
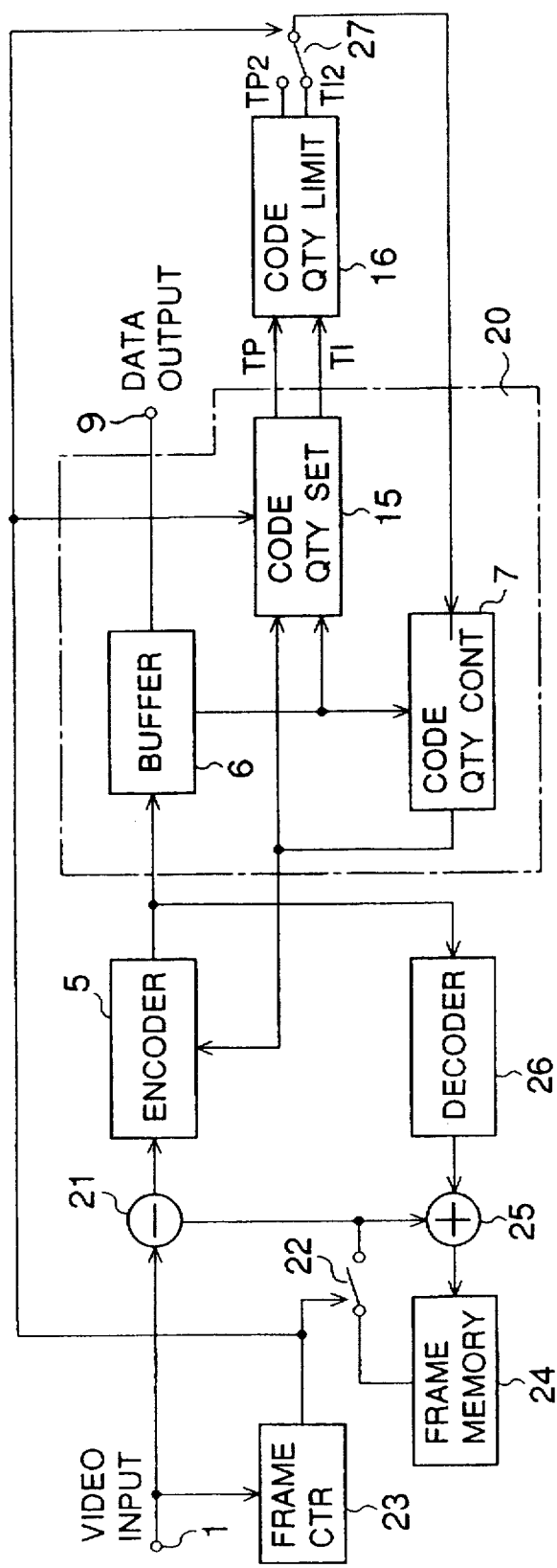
FIG. 3 is a block diagram showing a second embodiment of the image encoding apparatus according to the present invention.

A second embodiment of the image encoding apparatus according to the present invention will be described hereinbelow with reference to FIG. 3. In FIG. 3, the same reference numerals have been retained for similar elements which have the same functions as with the case of the first embodiment previously described with reference to FIG. 2, and any detailed description is omitted herein.

In this embodiment, the inter-picture prediction encoding is effected. Further, the video data are decoded for each frame independently and periodically at intervals of several frames. The independently encoded video data are recorded in a recording medium, and only the video data independently encoded can be reproduced, thus enabling a high speed search.

The image encoding apparatus shown in FIG. 3 is provided with an encoder 5 for encoding the priority image information and the non-priority image information in time division mode, first code quantity control means 20 for controlling the sum total of the generated code quantity of both the priority and non-priority image information within a predetermined value, and a code quantity limiter 16 for controlling the code quantity of the priority image information within a predetermined ratio to the sum total code quantity of the two.

The first code quantity control means 20 is composed of a buffer 6, a code quantity controller 7, and a code quantity setter 15. Further, a second code quantity control means is the code quantity limiter 16.

In FIG. 3, a video signal inputted through an input terminal 1 is given to a prediction subtracter 21 and a frame counter 23, respectively. The prediction subtracter 21 subtracts a prediction signal given by a frame memory 24 via a switch 22 from the inputted video signal, and the prediction residual signal is given to the encoder 5.

In the same way as with the case of the first embodiment shown in FIG. 2, the encoder 5 executes the DCT processing, quantizes the transformed coefficients on the basis of the quantization step size given by the code quantity controller 7 to obtain variable-length encoded compressed video data. The obtained video data are applied to the buffer 6 and a decoder 26, respectively. The buffer 6 uniformalizes the fluctuations of the generated code quantity of the video data, and outputs the video data of uniformalized code quantity through a data output terminal 9.

The decoder 26 executes the processing opposite to that of the encoder 5. The encoded data can be reproduced by the decoder 26 as the prediction residual signal. The decoded signal is given to an adder 25. The adder 25 adds the prediction residual signal and the prediction signal. The added signal is given to the frame memory 24 as a reproduced image. The reproduced image is delayed by one frame through the frame memory 24, and then given to the prediction subtracter 21 via the switch 22.

The switch 22 is opened by an independent control signal outputted by the frame counter 23 once at intervals of 5 to 15 frames, for instance. When the switch 22 is opened, the prediction signal is not given to the prediction subtracter 21.

Therefore, the inputted video signal is given to the encoder 5 as it is, and the image of this frame is encoded within the frame as the independent frame. The frame counter 23 detects the synchronizing signals of the inputted video signal, and obtains the independent control signal by counting the synchronizing signal at a predetermined period.

The code quantity is controlled as follows: In FIG. 3, the generated code quantity for each pixel block to be processed is given from the buffer 6 to the code quantity setter 15 and the code quantity controller 7, respectively. Further, the quantization step size is given from the code quantity controller 7 to the encoder 5 and the code quantity setter 15, respectively.

In the same way as with the case of the first embodiment shown in FIG. 2, the code quantity setter 15 sets a target code quantity on the basis of the obtained information. In this embodiment, however, since the priority image is the independent image and further the processing is executed in time division mode, the information is obtained for each period between the current independent image and the succeeding image (e.g., for each 5 to 15 frames). Therefore, a target code quantity TI of the succeeding one-period independent image and a target code quantity TP of the prediction image can be both set.

The set target code quantities TI and TP are given to the code quantity limiter 16. The code quantity limiter 16 limits the target code quantity of the independent image in the same way as in the first embodiment shown in FIG. 2.

Here, if TI is smaller than a specified value (e.g., ½ of the total code quantity), the TI2 and TP2 are both kept as TI and TP. If TI is larger than the specified value, however, TI2 is determined to the specified value, and TP2 is determined to a value obtained by subtracting the specified value from the total code quantity. This specified value is dependent upon the recording form of the recording medium. For instance, when the specific tracks (on which the priority image information is recorded) are arranged in the ratio of 1 to 2, the specific value is determined to be ½ of the total code quantity. When arranged in the ratio of 1 to 3, the specific value is determined to be ⅓ of the total code quantity.

A switch 27 shown in FIG. 3 is switched in response to the output of the frame counter 23, that is, according to the sorts of the image to be encoded (i.e., the independent image or the prediction image). The limited target code quantity TI2 or TP2 is selectively given to the code quantity limiter 7.

A third embodiment of the image encoding apparatus according to the present invention will be described hereinbelow with reference to FIG. 4. In this embodiment, the coarsely quantized video data and finely quantized video data (high quality image) are encoded hierarchically according to the quantization rate. In practice, the coarsely quantized video data of low transfer rate and the error component data obtained by encoding the quantization error of the coarsely quantized video data are both encoded hierarchically. During reproduction of this embodiment, it is possible to obtain an image from the video data of the low-transfer rate and further an image of high quality by adding both decoded video data.

In the hierarchical processing as described above, a high quality image can be obtained as an original image on the basis of both the video data. When the transfer rate is restricted in broadcasting, however, it is possible to broadcasting only the video data of less code quantity.

Figure 4:
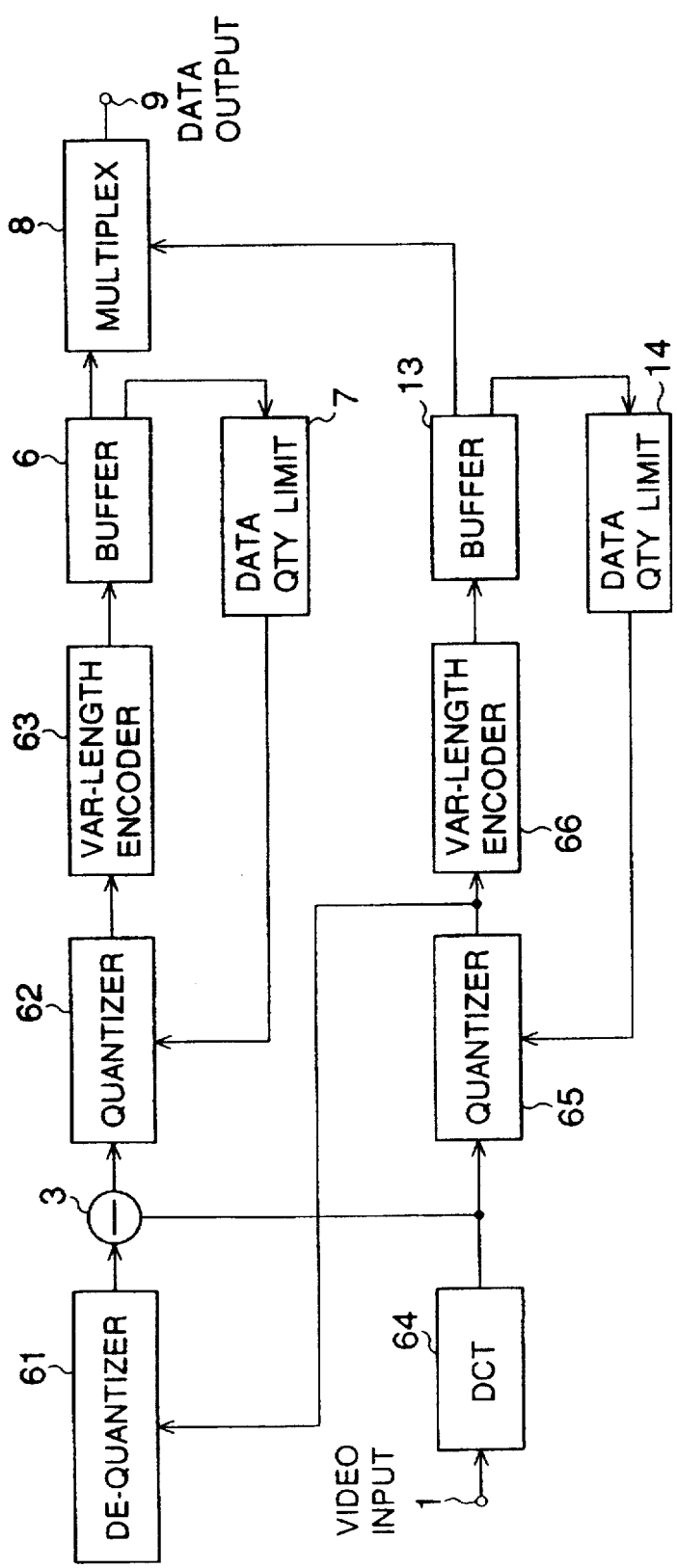
FIG. 4 is a block diagram showing a third embodiment of the image encoding apparatus according to the present invention.

In FIG. 4, the same reference numerals have been retained for the similar elements which have the same functions as with the case of the prior art apparatus as shown in FIG. 1.

The video signal inputted through the input terminal 1 is given to a DCT 64 for discrete cosine transformation processing. The coefficients obtained as the results of the processing are given to a quantizer 65 and a subtracter 3. The given coefficients are quantized by the quantizer 65 on the basis of a wide quantization step size given by a code quantity controller 14. The fixed-length codes thereof are given to a variable-length encoder 66 and a dequantizer 61, respectively. The fixed-length code is encoded into variable-length code by the variable-length encoder 66 to obtain a low-transfer rate video data. The obtained video data are given to a buffer 13.

On the other hand, the dequantizer 61 replaces the fixed-length code with a representative value of quantization corresponding thereto as a reproduction coefficient, and the replaced reproduction coefficient is given to the subtracter 3. The subtracter 3 subtracts the reproduction coefficient from the output of the DCT 64 to obtain an error component signal. The obtained error component signal is applied to the quantizer 62.

The quantizer 62 quantizes the error component signal on the basis of the quantization step size given by the code quantity controller 7. This quantization step size is narrower than that obtained by the quantizer 65.

The output of the quantizer 62 is given to the variable-length encoder 63, and the fixed-length code is encoded into variable-length code to obtain the error component data. The obtained error component data are given to a buffer 6. A multiplexer 8 multiplexes the error component data outputted by the buffer 6 and the low-transfer rate video data outputted by the buffer 13, and then outputs the multiplexed video data through a data output terminal 9.

Further, in this third embodiment, since the same signal is encoded hierarchically on the basis of the quantization rate, it is unnecessary to provide means for balancing the quantization between the hierarchies.

Here, there is described the state where the data stream encoded by the image encoding apparatus according to the present invention are recorded on a recording medium. In the case of a VTR, a great number of information tracks on which data are recorded are formed and arranged on a recording medium. One track of the several tacks is used as a specific track on which the priority image such as the low-resolution image or the independent image is to be recorded.

Figure 5:
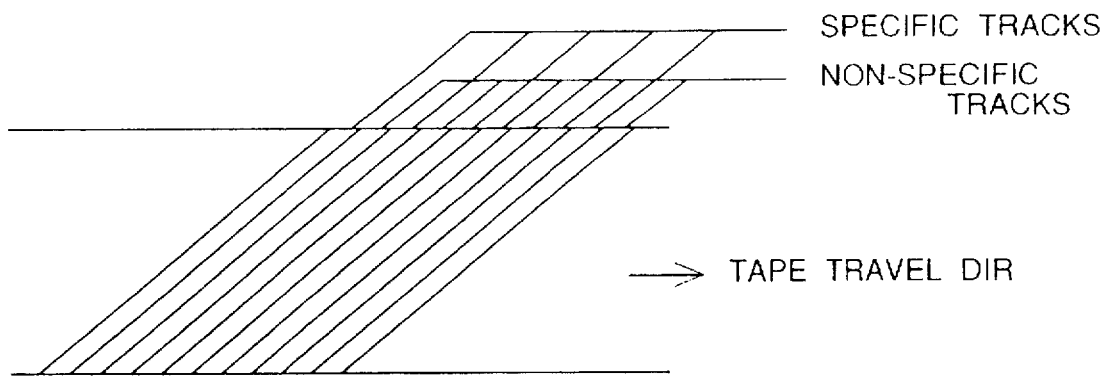
FIG. 5 is a graphical representation for assistance in explaining a recording mode of a recording medium.

FIG. 5 shows an example of the recording form of the recording medium, in which the specific tracks and the non-specific tracks are arranged alternately.

Figure 6:
FIG. 6 is an illustration for assistance in explaining the examples of data forms.
Figure 6:

Further, FIG. 6 shows an example of the data form. As shown in FIG. 6, when the allowable code quantity of the priority image information is the maximum, the specific tracks are filled with the priority image information, and the non-priority image information other than the priority image information is recorded on the non-specific tracks other than the specific tracks. However, when the code quantity of the priority video data is smaller than the maximum value, the non-priority image information is recorded on the non-specific tracks and additionally on a part of the specific tracks.

Since the image information is recorded on the recording medium as described above, the multiplexer 8 shown in FIG. 2 forms the encoding information in accordance with a format which matches the recording form of the information tracks.

As described above, in the image encoding apparatus according to the present invention, since the image information of a specific sort is encoded as the priority image information in such a way that the code quantity of the priority image information can be determined less than a constant ratio to that of the whole image information, it is possible to record the priority image information in the ratio of one track to the several tracks, so that it is possible to record all the priority image information on the specific tracks each formed at intervals of several tracks on a recording medium.

Further, since the code quantity of the priority image information is determined less than a predetermined ratio to that of the whole image information, there exists a degree of freedom, with the result that it is possible to obtain an optimal image quality in the respective determined ranges. Further, the number of tracks on which the priority image information are recorded is relatively small, it is possible to read the recorded image information at high speed, so that a high-speed high-quality search image can be obtained.

Further, it is possible to obtain low-resolution image from a recording medium on which the fine-definition image information is recorded, so that it is possible to use the recording medium and the reproducing apparatus in common for both the high definition image and the low-resolution image.

What is claimed is:

1. An apparatus for encoding image information comprising:

a first encoding means for encoding priority image information, the image being reproducible only with the priority image information, second encoding means for encoding non-priority image information except the priority image information;

first control means for controlling a quantity of generated codes so that a sum of quantities of the encoded priority image information and the non-priority image information is smaller than a predetermined quantity; and second control means for controlling the quantity of generated codes so that the quantity of the encoded priority image information is variable and smaller than another predetermined quantity within a predetermined ratio to the sum of quantities.

2. The apparatus of claim 1, wherein the first encoding means encodes priority image information which is independent encoded image information encoded by inter-image prediction encoding or low-resolution image information encoded by hierarchical encoding.

3. The encoding apparatus of claim 1, wherein said first control means comprises:

quantization step size control means for controlling a quantization step size of each of said first and second encoding means;

setting means responsive to the quantities of the priority and non-priority image information and the respective quantization step sizes, for setting first and second target code quantities of said first and second encoding means, respectively to obtain the predetermined quantity; and said second control means comprises means responsive to the first and second target code quantities, for controlling said quantization step size control means.

4. An apparatus for encoding image information to be recorded on a recording medium, comprising:

separating means for separating first image information, an image being reproducible only with the first image information, and second image information, the image being not reproducible only with the second image information;

first encoding means for encoding the first image information;

second encoding means for encoding the second image information;

outputting means for multiplexing codes outputted by said first and second encoding means and outputting the multiplexed codes;

first control means for controlling quantity of the multiplexed codes within such a first predetermined code quantity that quantities of the first and second codes outputted by the first and second encoding means, respectively can be balanced with each other; and second control means for controlling the first and second code quantities in such a way that the first code quantity is variable and determined within a predetermined quantity of the multiplexed code quantity according to a recording format of the recording medium, wherein said first control means comprises:

quantization step size control means for controlling a quantization step size of each of said first and second encoding means; and setting means responsive to the first and second code quantities and the respective quantization step sizes, for setting first and second target code quantities of said first and second encoding means, respectively to obtain the first predetermined code quantity; and said second control means comprises means responsive to the first and second target code quantities, for controlling said quantization step size control means.

5. The encoding apparatus of claim 4, wherein when the second target code quantity is less than a second predetermined code quantity determined according to the recording format of the recording medium, said means for controlling said quantization step size control means controls said quantization step size control means on the basis of the first and second target code quantities; and when the second target code quantity is more than the second predetermined code quantity, said means for controlling said quantization step size control means controls said quantization step size control means on the basis of the second target code quantity and a third target code quantity obtained by subtracting the second target code quantity from the multiplexed code quantity.

6. An apparatus for encoding image information comprising:

first encoding means for encoding priority image information, the image being reproducible only with the priority image information;

second encoding means for encoding non-priority image information except the priority image information;

first control means for controlling a quantity of generated codes so that a sum of quantities of the encoded priority image information and the non-priority image information is smaller than a predetermined quantity;

second control means for controlling the quantity of generated codes so that the quantity of the encoded priority image information is variable and smaller than another predetermined quantity within a predetermined ratio to the sum of quantities; and output means for multiplexing codes outputted by said first and second encoding means and outputting the multiplexed codes.

* * * * *

UNITED STATES PATENT AND TRADEMARK OFFICE
CERTIFICATE OF CORRECTION

PATENT NO. : 5,798,796
DATED : August 25, 1998
INVENTOR(S) : Kenji SUGIYAMA

It is certified that error appears in the above-identified patent and that said Letters Patent is hereby corrected as shown below:

On the title page column 1 item [54], change the title "CODING PRIORITY AND NON-PRIORITY IMAGE DATA TO BE LESS THAN A PREDETERMINED QUANTITY" to --IMAGE ENCODING APPARATUS FOR CODING PRIORITY AND NON-PRIORITY IMAGE TO BE LESS THAN A PREDETERMINED QUANTITY--.

Signed and Sealed this

Fifteenth Day of June, 1999

*Attest:*

Q. TODD DICKINSON

*Attesting Officer*   *Acting Commissioner of Patents and Trademarks*